W. W. WOOD, Jr.
FILLER PIPE FOR AUTOMOBILE GASOLENE TANKS.
APPLICATION FILED FEB. 28, 1914.
1,117,741.
Patented Nov. 17, 1914.
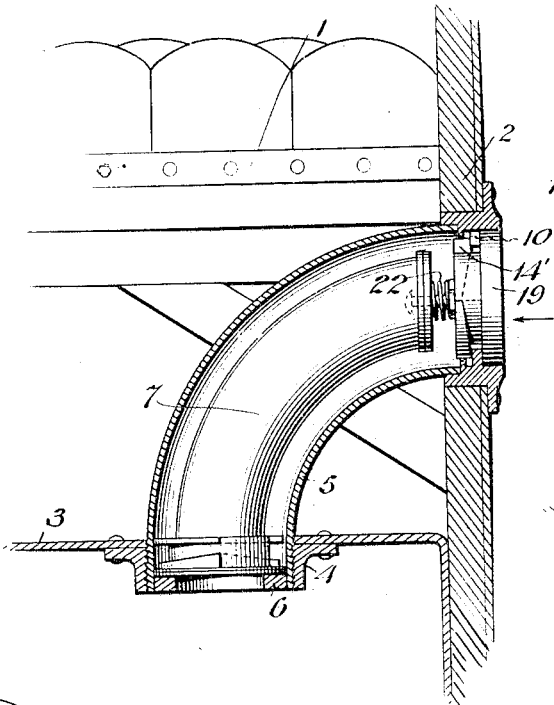
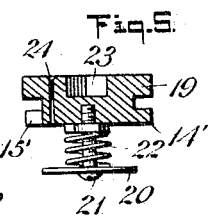
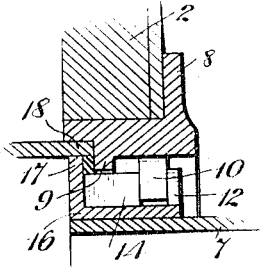
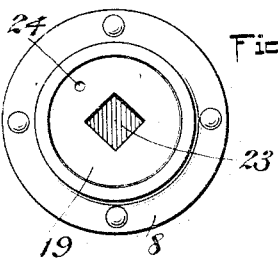
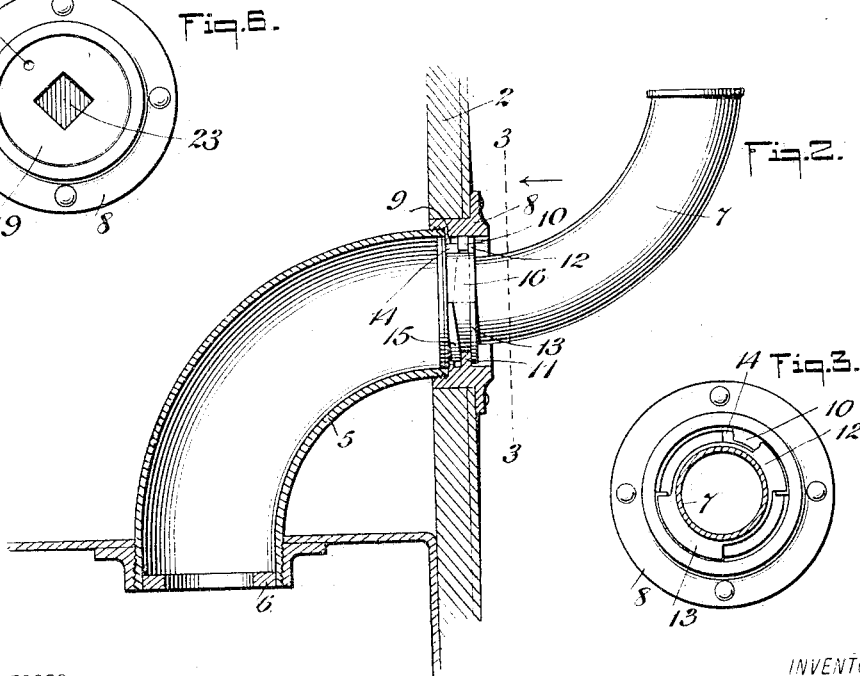
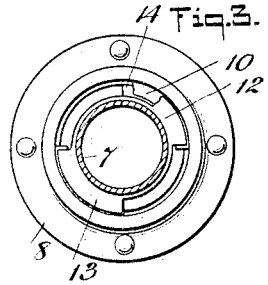
WITNESSES
INVENTOR
William Wilton Wood Jr.,
BY
ATTORNEYS

UNITED STATES PATENT OFFICE.

WILLIAM WILTON WOOD, JR., OF HUNTINGTON, NEW YORK.

FILLER-PIPE FOR AUTOMOBILE GASOLENE-TANKS.

1,117,741.  Specification of Letters Patent.  Patented Nov. 17, 1914.

Application filed February 28, 1914. Serial No. 821,687.

*To all whom it may concern:*

Be it known that I, WILLIAM WILTON WOOD, Jr., a citizen of the United States, and a resident of Huntington, in the county of Suffolk and State of New York, have invented a new and Improved Filler-Pipe for Automobile Gasolene-Tanks, of which the following is a full, clear, and exact description.

This invention relates to improvements in means for filling tanks, and has for an object to provide a structure which is easily operated and very convenient when used in connection with tanks on automobiles and similar vehicles.

Another object of the invention is to provide a telescoping pipe structure associated with the tanks of automobiles and the like which may be moved outwardly for providing a spout or filling member, and moved inwardly out of the way when not in use.

A still further object of the invention is to provide a telescoping filling member for automobile tanks which is adapted to extend outwardly from the side so that the seat of the automobile need not be collapsed during the filling operation.

In carrying out the object of the invention it will be noted that the filling arrangement may be used in tanks of any kind, in any place, but it is especially adapted for use on automobiles and other vehicles. In an ordinary automobile the gasolene tank is arranged beneath one of the seats, and when it is desired to fill the tank the top of that particular seat must be removed before the tank can be filled. This is more or less inconvenient when the automobile is on the road as the occupants of the seat must leave the seat during the filling of the tank. To overcome this inconvenience the filler embodying the invention is formed of a pair of curved pipes, one of which is rigidly secured to the tank and extends to the side of the seat, and the other telescopes in the first mentioned pipe when not in use, but when in use extends outwardly from the side of the seat so that a guiding tube is presented which has an entrance at a point exterior, or at a distant point from the occupants of the seat.

In the accompanying drawings—Figure 1 is a fragmentary sectional view through part of the automobile seat and tank, together with a filler embodying the invention; Fig. 2 is a section similar to Fig. 1 but showing a filler in a position ready to receive and guide fluid into the tank; Fig. 3 is a section through Fig. 2 on line 3—3; Fig. 4 is an enlarged fragmentary view of the connection between the inner and outer pipes and a gasket for providing a tight joint therebetween; Fig. 5 is a sectional view through a plug and a compression member used for holding the inner tube in place when not in use; Fig. 6 is a face view of the opening of the filler looking in the direction of the arrow, Fig. 1.

Referring to the accompanying drawings by numeral, 1 indicates a seat of an automobile and 2 the side of the seat. Beneath the seat 1 is arranged the usual tank 3 for containing the gasolene. Connected with tank 3 is a bushing 4 having threaded therein or secured thereto in any desired manner a tubular member 5 preferably arc-shaped, as shown in Figs. 1 and 2. The lower end of member 5 has arranged therein a ring 6 which acts as a stop for an inner tube 7. Ring 6 may be secured to tube 5 in any desired manner, as for instance by being sweated therein. The opposite end of tube 5 to that connected with tank 3 is connected with a bushing 8 secured in any desired manner to the side 2 of seat 1. Bushing 8 is also secured in any desired manner to tube 5, as for instance by being threaded thereto. The bushing 8 is provided with an annular flange 9 as shown more particularly in Fig. 4, and with cams 10 and 11 which act against the segmental flanges 12 and 13, and the cams 14 and 15. The cams 14 and 15, and the segmental flanges 12 and 13 are connected with a sleeve 16, which in turn is secured in any desired manner to the tube 7. The lower end of sleeve 16 is provided with a flange 17 adapted to engage the packing member 18 and press the same against the annular flange 9 so as to provide a tight joint when the inner tube 7 is in the outer or operative position shown in Fig. 2. The cams 10 and 11 preferably approximate one quarter of a circle and the cams 14 and 15 are also preferably of the same size, whereby openings are provided through which the segmental flanges 12 and 13 pass when moving the inner tube 7 from the position shown in Fig. 1 to the position shown in Fig. 2. By forming the members 10 and 11 and the cams, as described, the pipe or tube 7 upon a half revolution will be connected up as shown in Fig. 2, and by half a revolution in the opposite direction the same may be released, and may be moved or telescoped into tube 5, as shown in Fig. 1. When the tube 7 is arranged in tube 5, as shown in Fig. 1, the cap 19 is placed in position. The cap 19 is provided with cams 14' and 15' acting against the cams 10 and 11 so as to press the washer 20 against the upper end of pipe 7. Washer 20 is slidingly fitted upon the screw or bolt 21, and is pressed by spring 22 so that the washer 20 resiliently holds the pipe 7 in its nested position and prevents any rattling or noise. The cap 19 is provided with a wrench or key receiving opening 23 which is squared or formed irregular so that the cap may be easily turned for applying and removing. It will be observed that the notch or opening 23 is countersunk into the cap 19, whereby no projections are provided which may catch into anything passing the side 2 of seat 1. In addition to the key receiving notch 23 an air vent 24 is provided in cap 19. If desired, this air vent could be eliminated where the usual air vent is provided or when pressure is used in tank 3.

In operation, when it is desired to fill the tank 3 cap 19 is removed from the position shown in Fig. 1 and pipe 17 pulled outwardly and turned to the position shown in Fig. 2. The gasolene is then poured into pipe 7 until tank 3 is filled. A reverse movement of pipe 7 will allow the same to be again inserted into pipe 5, as shown in Fig. 1, after which cap 19 is placed in position. From this it will be seen that tank 3 may be easily filled without molesting anyone sitting on seat 1.

What I claim is—

1. In a filling device for tanks, the combination with an automobile body and tank, of a curved pipe rigidly connected with the top of the tank and with the side of the automobile body whereby there is an entrance to the tank from the outside of the automobile body, an auxiliary tube conforming to the shape of said first mentioned tube and fitting therein when in an inoperative position, a cap engaging the first mentioned tube and holding the auxiliary tube within the first mentioned tube when the tubes are not in use, and interlocking means connected with the auxiliary tube and main tube for holding the auxiliary tube in an extended position with the end pointing in the opposite direction to the lower end of the first mentioned tube whereby liquid matter may be inserted into said tank from the exterior of the automobile body.

2. In a filling device for tanks, a principal tube connected with a tank, an auxiliary tube arranged in said principal tube, interlocking members for holding said tubes together when the auxiliary tube is in an outer position, and a cap for closing the principal tube and resilient means extending from the cap and engaging said auxiliary tube for holding the auxiliary tube against movement when the auxiliary tube is nested within the principal tube.

3. A filling device comprising a pair of telescoping pipes, said pipes being arc-shaped, means for connecting said pipes together when the same are in an extended position, and a cap for the outer pipe provided with a spring pressed member adapted to engage and press against the inner pipe for holding the same against rattling when the pipes are nested.

In testimony whereof I have signed my name to this specification in the presence of two subscribing witnesses.

WILLIAM WILTON WOOD, Jr.

Witnesses:
RAYMOND H. LA CLAIR,
FRANK F. BARRETT.